US008542645B2

(12) United States Patent
Parkvall et al.

(10) Patent No.: US 8,542,645 B2
(45) Date of Patent: Sep. 24, 2013

(54) TECHNIQUE FOR TRANSMITTING ON MULTIPLE FREQUENCY RESOURCES IN A TELECOMMUNICATION SYSTEM

(75) Inventors: Stefan Parkvall, Stockholm (SE); Robert Baldemair, Solna (SE); Erik Dahlman, Bromma (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 347 days.

(21) Appl. No.: 13/119,512

(22) PCT Filed: Aug. 28, 2009

(86) PCT No.: PCT/EP2009/006264
§ 371 (c)(1),
(2), (4) Date: Mar. 17, 2011

(87) PCT Pub. No.: WO2010/031493
PCT Pub. Date: Mar. 25, 2010

(65) Prior Publication Data
US 2011/0171966 A1 Jul. 14, 2011

Related U.S. Application Data

(60) Provisional application No. 61/098,362, filed on Sep. 19, 2008.

(51) Int. Cl.
*H04Q 7/00* (2006.01)
(52) U.S. Cl.
USPC .......................................... 370/329; 370/330
(58) Field of Classification Search
USPC .................................................. 370/329–337
See application file for complete search history.

(56) References Cited

U.S. PATENT DOCUMENTS

| | | | |
|---|---|---|---|
| 8,010,070 B2* | 8/2011 | Anandakumar et al. | 455/207 |
| 8,145,251 B2* | 3/2012 | Love et al. | 455/522 |
| 8,374,146 B2* | 2/2013 | Ratasuk et al. | 370/329 |
| 2007/0173260 A1* | 7/2007 | Love et al. | 455/450 |
| 2007/0173276 A1* | 7/2007 | Love et al. | 455/522 |

(Continued)

FOREIGN PATENT DOCUMENTS

| | | |
|---|---|---|
| CN | 1909548 A | 2/2007 |
| EP | 1928115 A1 | 6/2008 |

OTHER PUBLICATIONS

Daneshrad, B. et al. "Performance and Implementation of Clustered-OFDM for Wireless Communications." Mobile Networks and Applications 2, 1997, pp. 305-314.

*Primary Examiner* — Chuong T Ho
(74) *Attorney, Agent, or Firm* — Coats & Bennett, P.L.L.C.

(57) ABSTRACT

The present disclosure relates to a technique for transmitting modulation symbols on multiple frequency resources. A method aspect of this technique includes applying a Discrete Fourier Transform (DFT) coding per set of modulation symbols of two or more sets of modulation symbols, wherein a first set of modulation symbols from the two or more sets of modulation symbols is transmitted on a set of frequency resources handled by the same power amplifier. Then, Orthogonal Frequency Division Multiplexing (OFDM) modulation is applied to the sets of DFT coded modulation symbols to output a first set of OFDM symbols for transmission on the set of frequency resources, and output another set of OFDM symbols for transmission on at least one additional frequency resource distinct from the set of frequency resources. Power amplification is then applied per set of frequency resources at the power amplifier.

20 Claims, 6 Drawing Sheets

(56) References Cited

U.S. PATENT DOCUMENTS

| | | | |
|---|---|---|---|
| 2007/0258540 A1* | 11/2007 | Ratasuk et al. | 375/267 |
| 2008/0025254 A1* | 1/2008 | Love et al. | 370/329 |
| 2008/0037413 A1* | 2/2008 | Gu et al. | 370/210 |
| 2008/0049603 A1 | 2/2008 | Geile et al. | |
| 2008/0049851 A1* | 2/2008 | Nangia et al. | 375/260 |
| 2010/0002575 A1* | 1/2010 | Eichinger et al. | 370/210 |
| 2011/0096658 A1* | 4/2011 | Yang et al. | 370/210 |
| 2011/0134747 A1* | 6/2011 | Kwon et al. | 370/208 |
| 2012/0172080 A1* | 7/2012 | Love et al. | 455/522 |
| 2012/0172081 A1* | 7/2012 | Love et al. | 455/522 |

* cited by examiner

Fig. 1 (PRIOR ART)

*Aggregated bandwidth of 100 MHz*

(PRIOR ART)

Fig. 2

*Aggregated bandwidth of 100 MHz*

(PRIOR ART)

TECHNIQUE FOR TRANSMITTING ON MULTIPLE FREQUENCY RESOURCES IN A TELECOMMUNICATION SYSTEM

TECHNICAL FIELD

The present invention relates to a method and arrangement in a telecommunication system, in particular to a technique for handling the aggregation of multiple frequency resources in an evolved Universal Terrestrial Radio Access Network or similar telecommunication network.

BACKGROUND

The Long-Term Evolution (LTE) of the Universal Terrestrial Radio Access Network (UTRAN), also denoted E-UTRAN, as standardized in Rel-8 of the 3rd Generation Partnership Project (3GPP) specifications supports transmission bandwidths up to 20 MHz. In the downlink, LTE uses conventional Orthogonal Frequency Division Multiplexing (OFDM) as the transmission scheme. OFDM provides benefits, e.g. it is robust to time dispersion, but has also some drawbacks, most notably a relatively high peak-to-average power ratio (PAR) of the transmitted signal.

Power amplifiers have to be designed to meet peak transmission power requirements while still meeting network requirements regarding the average output power (for example, determining the achievable data rate and coverage). The difference between the peak power and the average power determines the so-called amplifier back-off and is thus a measure on how much the power amplifier needs to be "over dimensioned" (or, equivalently, how much is lost in coverage when using the same amplifier but a lower-performance transmission scheme).

A high PAR implies a larger power back-off in the power amplifier, that is, the power amplifier cannot be used to its full extent. The Cubic Metric (CM) is another, generally more accurate metric, that can be used to represent the amount of back-off required in the power amplifier. In the following, the term "power amplifier metric" (denoting, e.g., PAR, CM, or any other appropriate measure) is used which shall be generally understood as a measure representing the impact of the difference or ratio between the peak power and the average power on the power amplifier design.

In the uplink, a high power amplifier metric can lead to reduced coverage, higher battery consumption, and/or more expensive implementation. Therefore, for the uplink, LTE has adopted a single-carrier transmission scheme with low power amplifier metric known as DFT (Discrete Fourier Transform)-spread OFDM (DFTS-OFDM) or DFT-precoded OFDM (sometimes also referred to as Single-Carrier Frequency Division Multiple Access, or SC-FDMA). SC-FDMA exhibits a significantly lower PAR than OFDM.

Figure 1:
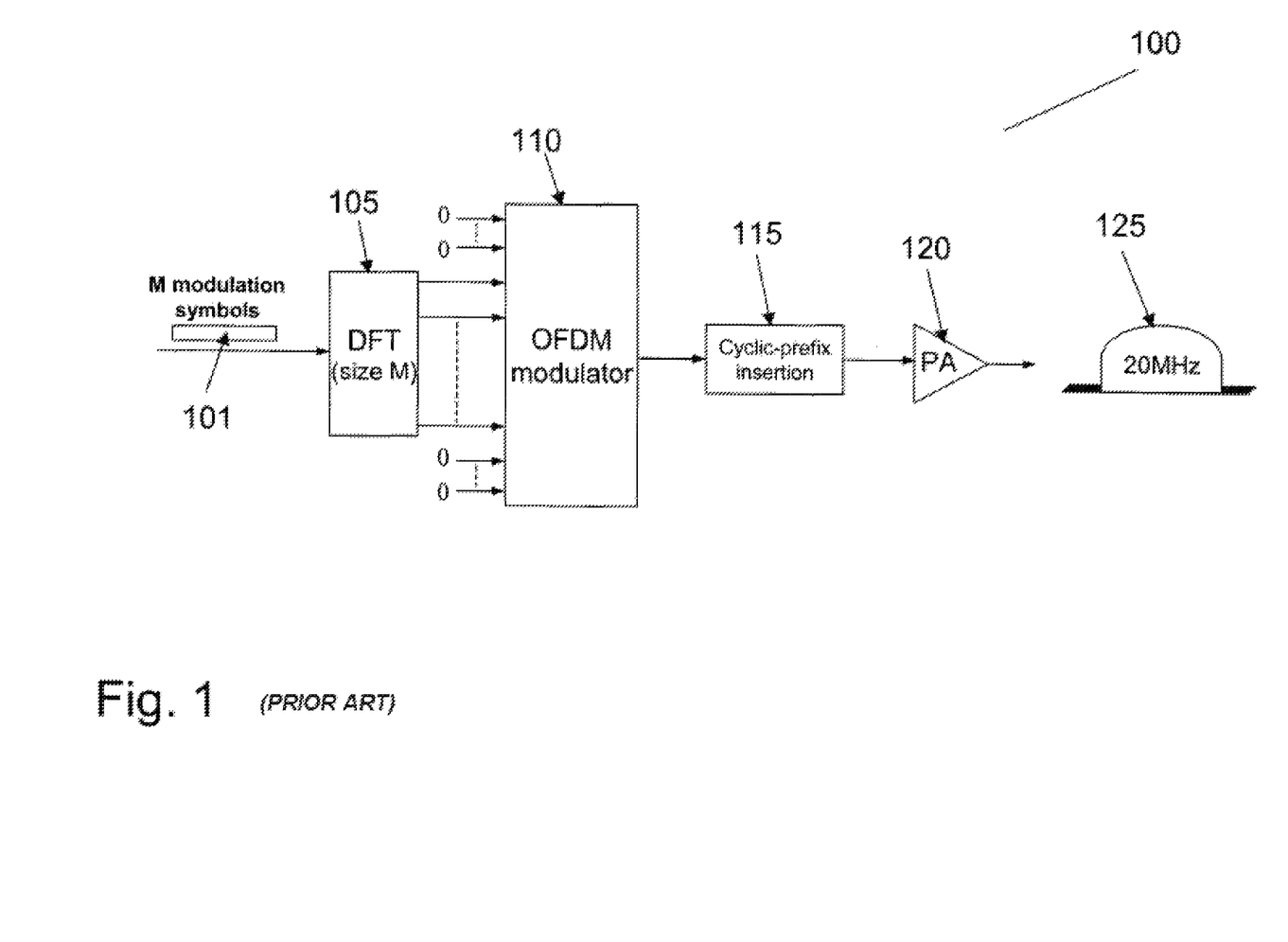
FIG. 1 schematically illustrates an example transmitter implementation for transmitting on a frequency resource.

FIG. 1 is a schematic illustration of an example of an SC-FDMA transmitter stage 100 operable to transmit on a single carrier according to the LTE transmission scheme. In transmitter stage 100, DFT coder 105 is coupled to OFDM modulator 110 which in turn is coupled to power amplifier 120 through a cyclic-prefix insertion stage 115 operable to insert a cyclic prefix in the output from OFDM modulator 110 before the output is amplified by power amplifier 120 for transmission over carrier 125. As shown in FIG. 1, carrier 125 has a bandwidth of 20 MHz. Carrier 125 may be referred to as a frequency resource for the transmission of a set of data blocks. While in FIG. 1, carrier 125 is shown as having a 20 MHz bandwidth, other bandwidths are possible in the LTE transmission scheme, and the bandwidth may vary (e.g., depending on the number of symbols to be transmitted via carrier 125).

Modulation symbols 101, shown in FIG. 1 as M modulation symbols, are input to DFT coder 105 and the output of DFT coder 105 is mapped to selective inputs of OFDM modulator 110. Examples of OFDM modulators comprise an Inverse Fast Fourier Transform (IFFT). The output of OFDM modulator 110 contains the data of modulation symbols 101 ("OFDM symbols") and is amplified by power amplifier 120 for transmission over carrier 125.

The DFT size, for example the size of the DFT performed by DFT coder 105, determines the instantaneous bandwidth of the transmitted signal while the exact mapping of the DFT coder output to the input of the OFDM modulator 110 determines the position of the transmitted signal within the overall uplink transmission bandwidth. Similar to conventional OFDM, a cyclic prefix is inserted subsequent to OFDM modulation. The use of a cyclic prefix allows for straightforward application of low-complexity frequency-domain equalization at the receiver side.

In order to meet requirements for International Mobile Telecommunications-Advanced (IMT-Advanced), 3GPP has initiated work on LTE-Advanced. One aspect of LTE-Advanced is to develop support for bandwidths larger than 20 MHz. Another aspect is to assure backward compatibility with LTE Rel-8. Backward compatibility also includes spectrum compatibility. Thus, in one exemplary implementation, to allow for backwards compatibility with LTE Rel-8, an LTE-Advanced spectrum or carrier that is wider than 20 MHz may appear as a number of separate LTE carriers to an LTE Rel-8 terminal. Separate LTE carriers may be referred to as different frequency resources. Thus, each Rel-8 LTE carrier can be referred to as a single frequency resource.

For early LTE-Advanced deployments, it can be expected that there will be a smaller number of LTE-Advanced-capable terminals compared to many LTE legacy terminals. Therefore, it is desirable to enable the use of frequency resources such that legacy terminals can be scheduled in all parts of the available wideband LTE-Advanced bandwidth. The straightforward way to allow for such optimal backwards compatibility would be by means of frequency resource aggregation. Frequency resource aggregation implies that an LTE-Advanced terminal can receive and transmit on multiple frequency resources, where each frequency resource may have, or may be modified to have, the same structure as a Rel-8 LTE carrier.

Figure 2:
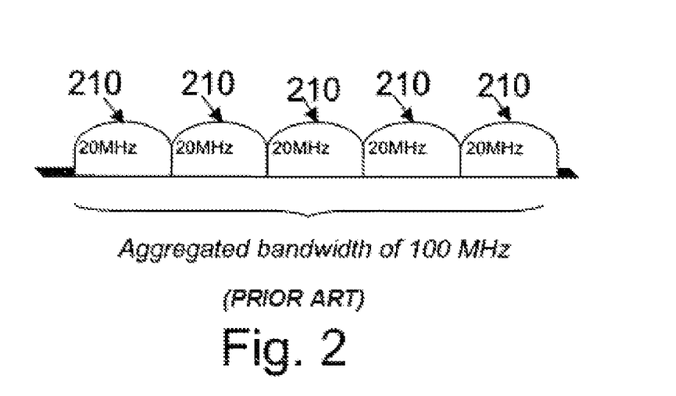
FIG. 2 illustrates an example of carrier aggregation over a contiguous spectrum.

An example of the aggregation of multiple frequency resources is illustrated in FIG. 2. Frequency resources 210 in FIG. 2 are all located next to each other so as to be contiguous. In the specific example of FIG. 2, each frequency resource has a bandwidth of 20 MHz. Together, the five frequency resources 210 shown in FIG. 2 aggregate to an aggregated bandwidth of 100 MHz. The frequency resource aggregation shown in FIG. 2 requires that the operator has access to a contiguous spectrum allocation which can be divided to achieve the number of aggregated frequency resources. While in the drawings frequency resources are shown having a bandwidth of 20 MHz, this is for purpose of illustrating a backwards compatible spectrum allocation. Generally, individual frequency resources may have any bandwidth depending upon the number of included subcarriers.

Figure 3:
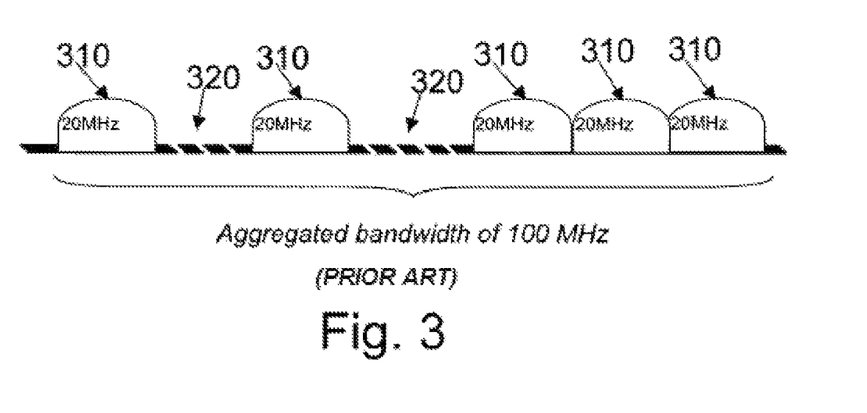
FIG. 3 illustrates an example of carrier aggregation over a non-contiguous spectrum.

To provide additional spectrum flexibility, LTE-Advanced may also support aggregation of non-contiguous spectrum fragments, which may be referred to as spectrum aggregation, an example of which is illustrated in FIG. 3. In the particular example of FIG. 3, five frequency resources 210 are spectrum aggregated to provide an aggregated bandwidth of 100 MHz. One or more frequency resources 210 are separated by spectrum gaps 320 which separate the one or more frequency resources 210 such that those frequency resources 210 separated by spectrum gaps 320 are not contiguous. Spectrum aggregation allows for the flexible addition of spectra for transmission. For example, an operator may bring into use different spectrum fragments over time depending upon availability for use by the operator.

The DFTS-OFDM property of a relatively low power amplification metric should be maintained as much as possible when extending the transmission bandwidth across multiple frequency resources, as for example, part of achieving or adding spectra to an LTE-Advanced system (e.g., having a spectrum allocation such as that shown in FIG. 3). To achieve a system operable to implement LTE-Advanced by extending the transmission bandwidth across multiple frequency resources, the structure of transmitter stage 100 of FIG. 1 may be generalized to transmit on one or more distinct frequency resources as shown in FIG. 4.

Figure 4:
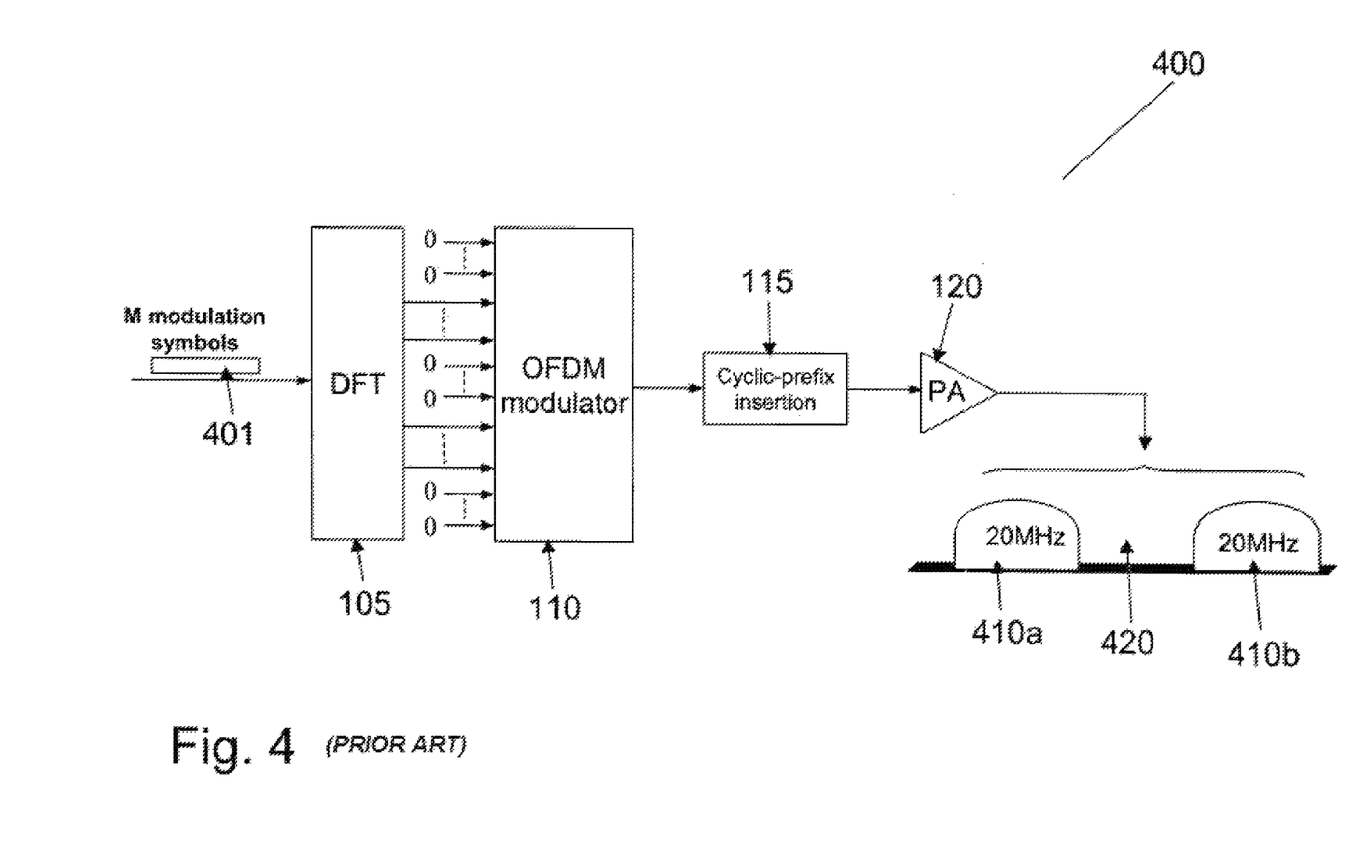
FIG. 4 schematically illustrates an example transmitter implementation for transmitting on multiple frequency resources.

FIG. 4 is a schematic illustration of an example of such a generalized transmitter stage 400 operable to be compliant with LTE-Advanced by transmitting on multiple frequency resources. In transmitter stage 400, DFT coder 105 is coupled to OFDM modulator 110 which in turn is coupled to power amplifier 120 through a cyclic-prefix insertion stage 115 operable to insert a cyclic prefix in the output from OFDM modulator 110 before the output is amplified by power amplifier 120 for transmission over different frequency resources 410a, 410b.

As shown in FIG. 4, transmitter stage 400 may be operable to receive modulation symbols 401 for transmission on frequency resources 410a, 410b substantially simultaneously. As can been seen from FIG. 4, frequency resources 410a and 410b are separated by spectrum gap 420 and are hence non-contiguous. As also shown in FIG. 4, each frequency resource 410 has a bandwidth of 20 MHz, thus the spectrum aggregation of the two frequency resources yields a total bandwidth of 40 MHz.

In the system of FIG. 4, DFT coder 105 and OFDM modulator 110 are scaled to match the larger bandwidth. The output of DFT coder 105 is connected to the input of OFDM modulator 110. Because the two frequency resources 410 are not contiguous in frequency, zeros will be input to OFDM modulator 110 to allow for gap 420. In one embodiment of a possible future extension, the control signaling on the Physical Uplink Control Channel (PUCCH) may be located at each of the band edges of the LTE uplink, that is, for example, at the band edges of each frequency resource.

The structure shown in FIG. 4 is sometimes referred to as Clustered DFTS-OFDM (CL-DFTS-OFDM), where the term clustered refers to the fact that the frequency resources are not necessarily contiguous in frequency but located close to each other. The power amplifier metric of the generated signal is higher than that of conventional DFTS-OFDM, as shown, for example, in FIG. 1, but still low compared to OFDM and increases with the number of clusters.

SUMMARY

Accordingly, it is an object to provide a technique to reduce the power amplifier metric in an LTE-Advanced or similar system relying at least in part on non-contiguous frequency resources.

To this end, according to a first aspect, a method of transmitting modulation symbols on multiple frequency resources is described. The method includes applying a DFT coding per set of modulation symbols of two or more sets of modulation symbols, wherein a first set of modulation symbols from the two or more sets of modulation symbols is to be transmitted on a set of frequency resources handled by the same power amplifier. Then, OFDM modulation is applied to the sets of DFT coded modulation symbols to output a first set of OFDM symbols for transmission on a set of frequency resources, and to output another set of OFDM symbols for transmission on at least one frequency resource distinct from the set of frequency resources used to transmit the first set of modulation symbols. The output of the OFDM modulator carrying the first set of modulation symbols to be transmitted over the set of frequency resources is amplified by a power amplifier exclusive of the power amplification of the output to be transmitted over other frequency resources. Thus, power amplification per set of frequency resources is achieved.

According to another aspect, a system operable to implement the above method includes a transmitter stage adapted to transmit modulation symbols on multiple frequency resources. The functionality of the transmitter stage may be implemented with multiple stages and components.

For example, in one aspect, the transmitter stage may include a first DFT coder operable to receive modulation symbols to be transmitted and a second DFT coder operable to receive modulation symbols to be transmitted on a set of frequency resources. A first OFDM modulator is associated with said first DFT coder and coupled to said first DFT coder to receive output from the first DFT coder, and operable to output OFDM symbols for transmission on at least one frequency resource distinct from the set of frequency resources. The transmitter stage further includes a second OFDM modulator associated with the second DFT coder and coupled to the second DFT coder to receive output from said second DFT coder, and operable to output OFDM symbols for transmission on the set of frequency resources. A first power amplifier is coupled to receive output of the first OFDM modulator and is operable to amplify said output for transmission on said at least one frequency resource. A second power amplifier is coupled to receive said output of the second OFDM modulator to and operable to amplify the output for transmission on the set of frequency resources.

Further aspects, which may or may not be included in particular implementations of the techniques disclosed herein, may serve to provide further functionality and additional features.

For example, each frequency resource may have a spectrum bandwidth spanning a frequency range compatible in bandwidth to a telecommunication system spectrum bandwidth. The spectrum bandwidth may be defined by the spectrum (e.g., carrier) bandwidth of a legacy telecommunication system. In the exemplary case of an LTE-Advanced system, each frequency resource may thus be defined by the spectrum bandwidth of an LTE system (of typically 1.25/2.5, 5, 10, 15 or 20 MHz).

In a further example, which may or may not be implemented, the above-described transmitter stage may further comprise a third DFT coder operable to receive modulation symbols to be transmitted on a second set of frequency resources, wherein the frequency resources of the second set of frequency resources are distinct from the other frequency resources, and a third OFDM modulator coupled to said third DFT coder to receive output from said third DFT coder, and operable to output OFDM symbols for transmission on the second set of frequency resources. A third power amplifier may be coupled to receive the output of the third OFDM modulator and operable to amplify the received output for transmission.

For example, a terminal comprising the above-described transmitter stage may be operable to negotiate with the network, be instructed by the network or decide autonomously to use the second (or any further) DFT coder and/or transmit on a set of frequency resources. In addition, in some implementations, the second DFT coder is coupled to receive modulation symbols from a demultiplexing stage. The second power amplifier may further be coupled to receive the output of the second OFDM modulator through a cyclic-prefix insertion stage operable to insert cyclic-prefixes in said output from said second OFDM modulator.

Demultiplexing one or more inputs may be used to input modulation symbols to DFT coders. Because frequency resources may be aggregated across a frequency spectrum in a discontinuous manner, a set of frequency resources may be non-contiguous with other frequency resource(s).

In an aspect, each set of frequency resources comprises a limited number of frequency resources. Thus, a DFT coding may be applied per a limited number of frequency resources and output to be transmitted over the limited number of frequency resources may be amplified by an associated power amplifier. According to another, optional, aspect, a set of frequency resources comprises contiguous frequency resources in the same frequency band.

Furthermore, aspects of the present invention also support the use of non-contiguous spectrum fragments. Non-contiguous frequency resources may be allocated from non-contiguous spectrum fragments (in, e.g., different frequency bands) as spectrum is used by or made available to an operator. Individual power amplifiers may be associated with individual continuous or non-contiguous frequency resources or sets of continuous, non-contiguous frequency resources. Thus, in one example, OFDM modulator output for transmission over a non-contiguous frequency resource or a set of non-contiguous frequency resources may be amplified per power amplifier, thus yielding a relatively low power amplifier metric per power amplifier.

The techniques presented herein may be realized in the form of software, in the form of hardware, or using a combined software/hardware approach. As regards a software aspect, a computer program product comprising program code portions for performing the steps presented herein when the computer program product is run on one or more computing devices may be provided. The computer program product may be stored on a computer-readable recording medium such as a memory chip, a CD-ROM, a hard disk, and so on. Moreover, the computer program product may be provided for download onto such a recording medium.

BRIEF DESCRIPTION OF THE DRAWINGS

Further aspects and advantages of the techniques presented herein will become apparent from the following description of embodiments and the accompanying drawings, wherein.

DETAILED DESCRIPTION

In the following description of preferred embodiments, for purposes of explanation and not limitation, specific details are set forth (such as particular transmitter stage components and sequences of steps) in order to provide a thorough understanding of the present invention. It will be apparent to one skilled in the art that the present invention may be practiced in other embodiments that depart from these specific details. It is evident that the techniques presented herein are not restricted to be implemented in LTE-Advanced systems exemplarily described hereinafter but may also be used in conjunction with other telecommunication systems.

Moreover, those skilled in the art will appreciate that the functions and steps explained herein below may be implemented using software functioning in conjunction with a programmed microprocessor, an Application Specific Integrated Circuit (ASIC), a Digital Signal Processor (DSP) or a general purpose computer. It will also be appreciated that while the following embodiments will primarily be described in context with methods and devices, the invention may also be embodied in a computer program product as well as in a system comprising a computer processor and a memory coupled to the processor, wherein the memory is encoded with one or more programs that may perform the functions and steps disclosed herein.

LTE-Advanced systems are designed to transmit across bandwidths and spectra exceeding 20 MHz. In order to allow for backwards compatibility, the bandwidth or spectrum transmitted upon by an LTE-Advanced system is separated into frequency resources (sometimes called "component carriers") which are themselves backwards compatible. In one scenario, a frequency resource may be a component carrier as utilized by an LTE legacy system. In an implementation example, a component carrier, and thus a frequency resource, may have a bandwidth up to 20 MHz and may be composed of resource blocks (comprising sub-carriers) which may be transmitted over.

More generally, a frequency resource may be thought of as a series of resource blocks having a bandwidth spanning a portion of a spectrum and existing for a span of N consecutive symbols in the time domain. Such time domain symbols may be OFDM (e.g., SC-FDMA) symbols, and the bandwidth of the resource block may span or include M consecutive sub-carriers. Thus a resource block is a block of N×M resource elements. Accordingly, LTE-Advanced systems have the potential to transmit upon multiple frequency resources, the individual frequency resources having the potential for different bandwidths. Examples of resource blocks are further discussed in the 3GPP Technical Specification 36.211 V8.7.0 (2009-05).

As described previously in the Background Section, to achieve an LTE-Advanced system, transmitter stage 100 depicted in FIG. 1 may be generalized to allow for transmission on multiple frequency resources substantially simultaneously, as, for example, shown in FIG. 4. As further previously discussed, a generalized transmitter stage, such as that shown in FIG. 4, exhibits an increasing power amplifier metric as the number of frequency resources scheduled for or handled by the transmitter increases. The increasing power amplifier metric requires that a correspondingly larger power back-off has to be built into the power amplifier of the generalized transmitter stage shown in FIG. 4. Building such a larger power back-off into a transmitter stage increases the overall size of the transmitter stage, thus undesirably bulking up the transmitter and causing increased power consumption.

To overcome the problem of an LTE-Advanced system transmitter exhibiting an increasing power amplifier metric as the number of frequency resources which are scheduled for the transmitter stage increases, the following embodiments apply a DFT coding per set of frequency resources as will be discussed below with reference to FIGS. 5 to 7. Because numerous frequency resources are divided into sets of frequency resources, each set of frequency resources has a limited number of frequency resources. Thus, DFT coding applied to a set of frequency resources is applied to a limited number of frequency resources.

The transmitter stage may also include multiple power amplifiers. Output for transmission over each set of frequency resources may be amplified at different power amplifiers such that each set of frequency resources is associated with an individual power amplifier and output transmitted over the set of frequency resources amplified by that amplifier. By amplifying output to be transmitted on sets of frequency resources per associated power amplifier, the power amplifier metric per power amplifier may be kept relatively low. Thus, the power back-off built into the power amplifier(s) may be reduced. In one aspect, reducing the number of non-contiguous frequency resources that are encoded by a single DFT reduces the power amplifier metric for the associated power amplifier.

A terminal operable to transmit on multiple frequency resources, such as, for example, in the uplink, is provided. The frequency resources are divided into sets such that a limited number of frequency resources form a set: output to be transmitted on each set will later be amplified for transmission using different power amplifiers, one power amplifier per set, as discussed above. Frequency resources in each set are transmitted on utilizing clustered DFTS-OFDM (CL-DFTS-OFDM) with different CL-DFTS-OFDM modulators used for the different sets. Such a structure can be referred to as Multi-Carrier CL-DFTS-OFDM (MC-CL-DFTS-OFDM). FIG. 6 schematically illustrates an example of such an MC-CL-DFTS-OFDM system that may be implemented in a terminal such as a mobile telephone, a data card or a portable computer.

Figure 5:
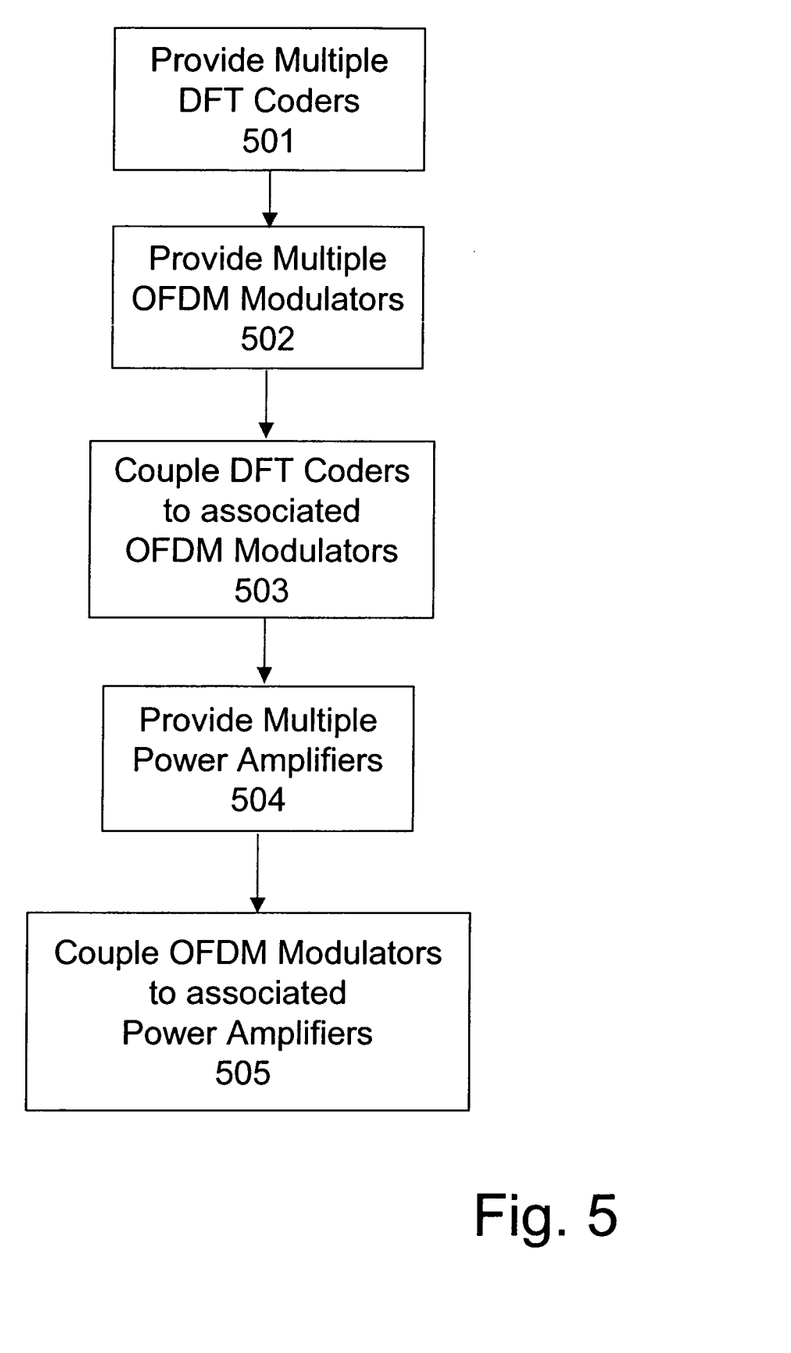
FIG. 5 shows a flow diagram of a method embodiment for implementing a transmitter operable to transmit on multiple frequency resources.
Figure 6:
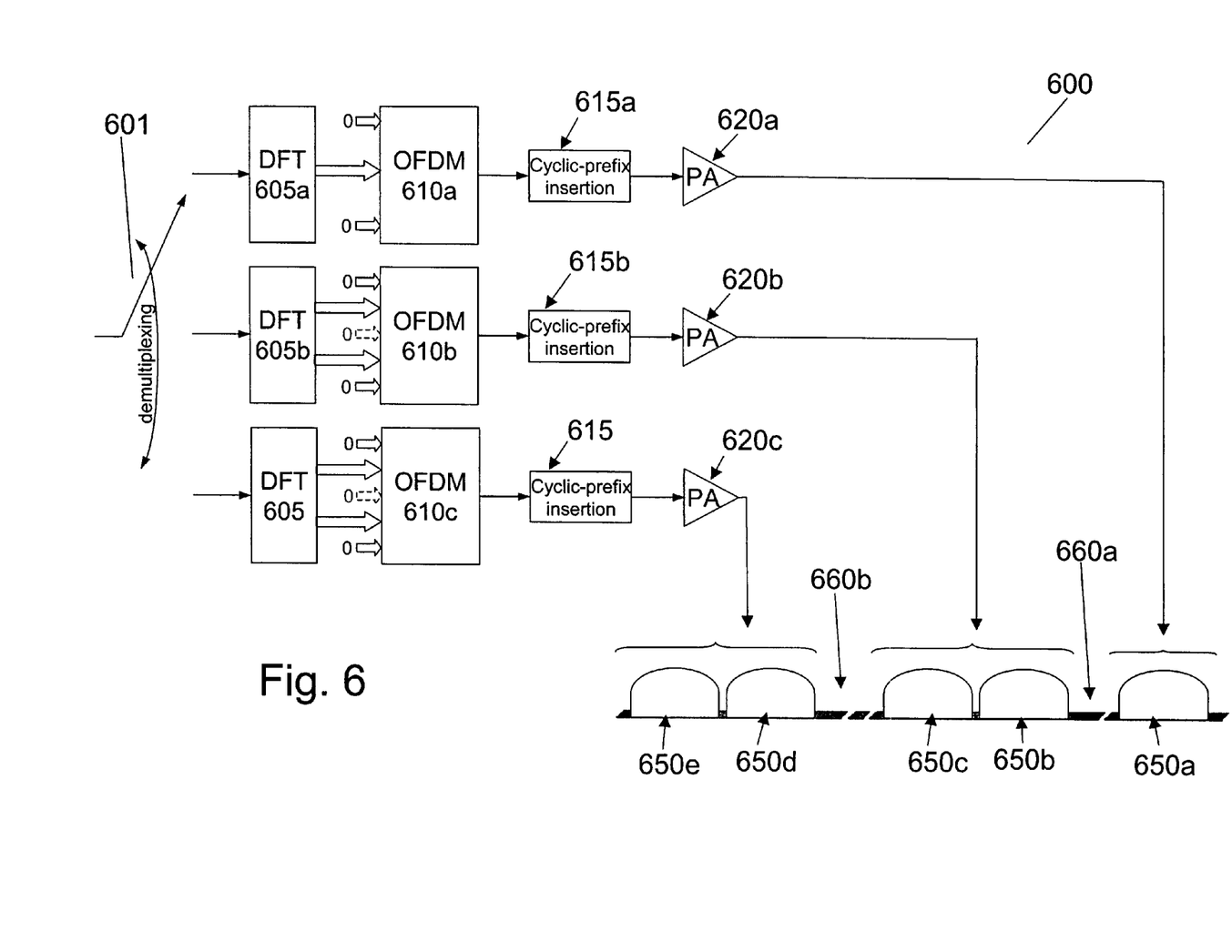
FIG. 6 schematically illustrates an embodiment of a transmitter implementation for transmitting on multiple frequency resources.

FIG. 5 is a flow diagram of a method embodiment for operating a transmitter stage 600 as shown in FIG. 6. At step 501, multiple DFT coders 605 are provided. At step 502, multiple OFDM modulators 610 are likewise provided. At step 503, the DFT coders 605 are coupled to their respective associated OFDM modulators 610. At step 504, multiple power amplifiers are provided and at step 505, the OFDM modulators 610 are coupled to their respective associated power amplifiers 620. Thus yielding the transmitter stage 600 shown in FIG. 6.

Referring to FIG. 6, in transmitter stage 600, each DFT coder 605 is coupled to an associated OFDM modulator 610 which in turn is coupled to an associated power amplifier 620 through a cyclic-prefix insertion stage 615. Each cyclic-prefix insertion stage 615 is operable to insert a cyclic prefix in the output from the respective OFDM modulator 610 before the output is amplified by the power amplifier 620 associated with the respective OFDM modulator 610.

As can be seen from FIG. 6, each individual power amplifier 620 amplifies OFDM modulator output for transmission over a set of frequency resources. As can further be seen from FIG. 6, the DFT coding of DFT coders 605 is applied per set of frequency resources such that modulation symbols coded by a DFT coder 605 are transmitted on a set of frequency resources located closely to each other in frequency (e.g., in the same frequency band). Thus, a DFT coding is applied per set of frequency resources and data output on a set of frequency resources is individually amplified by an associated power amplifier. Each set of frequency resources can have a limited number of frequency resources such that a DFT coding and corresponding OFDM modulation is applied per a limited set of frequency resources. By applying DFT coding and OFDM modulation per a limited number of frequency resources, the power amplification metric is reduced. More particularly, in one aspect, reducing the number of non-contiguous frequency resources coded with a DFT reduces the power amplification metric. This reduces the amount of back-off required in individual power amplifiers 620 receiving output from OFDM modulators 610.

In one optional aspect, the frequency resources forming a set of frequency resources are contiguous frequency resources in the same frequency band. This may also reduce the power amplification metric.

As shown in FIG. 6, a stream of modulation symbols is provided to DFT coders 605 by a demultiplexing stage 601. In an optional aspect, demultiplexing stage 601 can supply modulation symbols to each of DFT coders 605 such that each DFT coder 605 may be operable to output coded modulation symbols to its associated OFDM modulator 610 to allow the OFDM modulators 610 to output OFDM symbols for transmission on frequency resources substantially simultaneously. For example, demultiplexing stage 601 may supply modulation symbols to DFT coder 605b. DFT coder 605b may apply a DFT coding to the modulation symbols and pass the DFT-coded modulation symbols on to associated OFDM modulator 610b. OFDM modulator 610b may then output OFDM symbols for transmission on frequency resources 650b and 650c.

Figure 7:
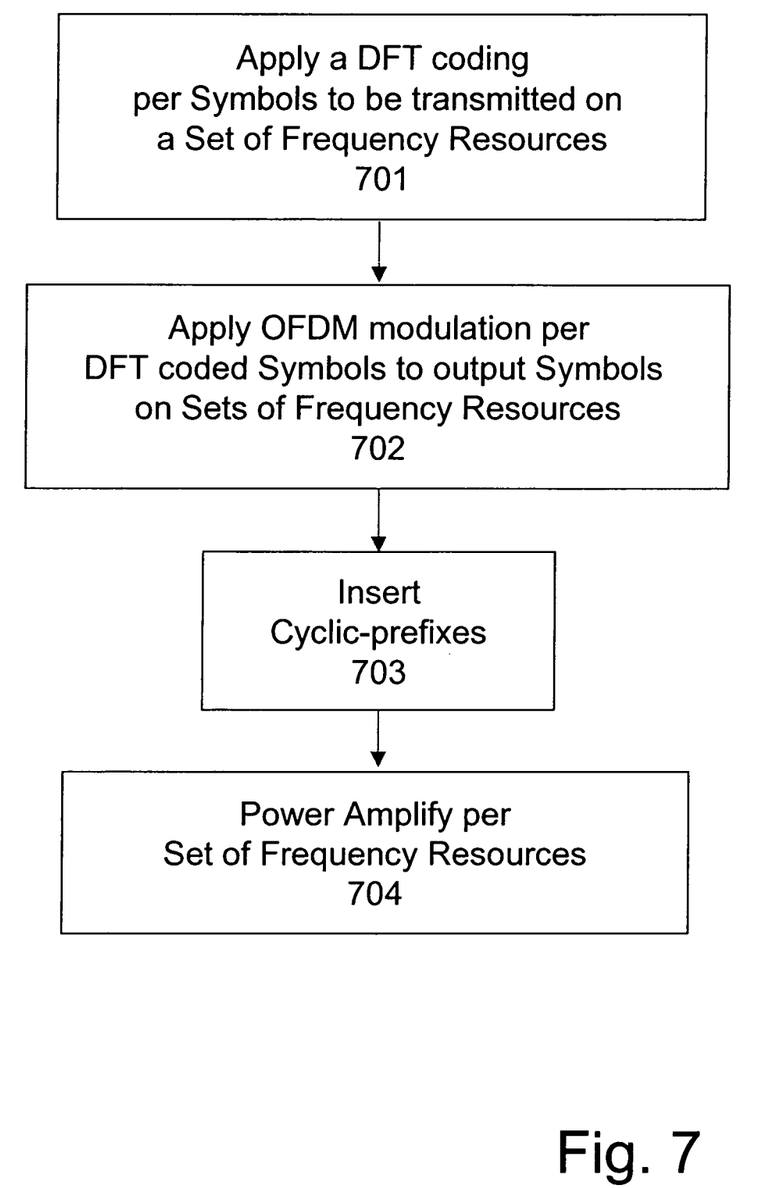
FIG. 7 shows a flow diagram of a method embodiment for transmitting on multiple frequency resources.

FIG. 7 is a flow diagram of a method embodiment for transmitting modulation symbols, which may be performed utilizing a transmitter stage such as transmitter stage 600 shown in FIG. 6.

At step 701, a DFT coding is applied by DFT coders 605 per set of symbols to be transmitted on the associated set of frequency resources. At step 702, OFDM modulation is applied by the respective OFDM modulators 610 per set of DFT coded symbols to output sets of OFDM symbols for transmission on sets of frequency resources. At step 703, a cyclic-prefix is inserted at cyclic-prefix insertion stage 615. At step 704, power amplifiers 620 amplify modulator output for transmission over sets of frequency resources such that each power amplifier 620 amplifies output for transmission over an associated set of frequency resources.

Referring to FIG. 6, power amplifier 620a amplifies output from OFDM modulator 610a for transmission over frequency resource 650a. Power amplifier 620b amplifies output from OFDM modulator 610b for transmission over the set of frequency resources comprising frequency resource 650b and frequency resource 650c. Power amplifier 620c amplifies output from OFDM modulator 610c for transmission over the set of frequency resources comprising frequency resource 650d and frequency resource 650e. Because the sets of frequency resources include a limited number of frequency resources, each DFT coding, OFDM modulation and power amplification is applied per a limited number of frequency resources, reducing the power amplification metric per power amplifier.

Frequency resource 650a is separated from the frequency resources associated with power amplifier 650b by gap 660a.

Similarly, the frequency resources associated with power amplifier 650b are separated from the frequency resources associated with power amplifier 650c by gap 660b. Thus, frequency resources 650 may be spectrum aggregated to achieve an aggregated bandwidth for the transmission of modulation signals or other data utilizing transmission stage 600 of FIG. 6.

According to a further aspect, a transmitter stage can be selected or configured which approximates one of the transmitter stages shown in FIG. 4 or FIG. 6. The selection of which structure to use for an uplink transmission may depend on the number of frequency resources that a terminal is scheduled to transmit upon. For example, in the event that a terminal has sufficient individual power amplifiers to amplify modulation output for transmission on each scheduled frequency resource individually, output to be transmitted on the frequency resources may be individually amplified, one frequency resource per power amplifier, as opposed to being amplified per sets of more than one frequency resources. In an alternative embodiment, the structure to be used is determined based on the number of power amplifiers allocated per user.

In addition to or as yet another aspect, the terminal and the network may negotiate which structure to use for different scenarios. For example, in a scenario where the number of frequency resources a terminal is scheduled to transmit on is less than or equal to the available power amplifiers, the power amplifiers may each amplify modulator output for transmission over a single frequency resource, even if the spectrum is contiguous.

By applying DFT coding per set of limited number of frequency resources, for example to a limited number of non-contiguous frequency resources, or amplifying sets of frequency resources per power amplifier, the advantage of a minimized power amplifier metric is achieved, thus allowing for smaller power amplifiers and allowing for a reduction in power consumption and power amplifier size. Thus the techniques disclosed herein provide an approach for transmitting and a transmitter stage yielding a power amplifier metric that is low when transmitting utilizing multiple frequency resources in an LTE-Advanced system. Further advantages of the disclosed techniques include maintaining a low power amplifier metric when transmitting over either frequency resource or spectrum aggregation aggregated spectra.

The achievement of a low power amplifier metric over the addition of multiple frequency resources allows for an inherently scalable system. Furthermore, because individual frequency resources are themselves backwards compatible in that they allow for use with legacy devices which may utilize a single frequency resource, a backwards compatible and scalable system which minimizes the power amplifier metric is achieved. In addition, this allows for the utilization of non-contiguous spectrum segments, thus enabling for the flexible addition of spectra or changing spectrum use, enhancing system flexibility.

It is believed that many advantages of the present invention will be fully understood from the forgoing description, and it will be apparent that various changes may be made in the form, construction and arrangement of the exemplary aspects thereof without departing from the scope of the invention or without sacrificing all of its advantages. Because the invention can be varied in many ways, it will be recognized that the invention should be limited only by the scope of the following claims.

The invention claimed is:

1. A transmitter stage configured to transmit modulation symbols on multiple component carriers, comprising:
   a first Discrete Fourier Transform (DFT) coder operable to receive modulation symbols to be transmitted on at least one component carrier;
   a first Orthogonal Frequency Division Multiplexing (OFDM) modulator associated with said first DFT coder, said first OFDM modulator coupled to said first DFT coder to receive output from said first DFT coder;
   a first power amplifier coupled to receive output of said first OFDM modulator and operable to amplify said output for transmission on the at least one component carrier;
   a second DFT coder operable to receive modulation symbols to be transmitted on a set of component carriers, wherein the component carriers of the set of component carriers are non-contiguous relative to each other and are distinct from the at least one component carrier;
   a second OFDM modulator associated with said second DFT coder, said second OFDM modulator coupled to said second DFT coder to receive output from said second DFT coder; and
   a second power amplifier coupled to receive output of said second OFDM modulator and operable to amplify said output for transmission on said set of component carriers.

2. The transmitter stage of claim 1, wherein a component carrier has a spectrum bandwidth spanning a frequency range compatible in bandwidth to a telecommunication system spectrum bandwidth.

3. The transmitter stage of claim 2, wherein the spectrum bandwidth is defined by the spectrum bandwidth of a legacy telecommunication system.

4. The transmitter stage of claim 1, further comprising:
   a third DFT coder operable to receive modulation symbols to be transmitted on a second set of component carriers, wherein the component carriers of the second set of component carriers are distinct from the at least one component carrier and any other set of component carriers;
   a third OFDM modulator associated with said third DFT coder, said third OFDM modulator coupled to said third DFT coder to receive output from said third DFT coder; and
   a third power amplifier coupled to receive output of said third OFDM modulator and operable to amplify said output for transmission on said second set of component carriers.

5. The transmitter stage of claim 1, wherein a terminal comprising said transmitter stage is configured to negotiate with a network to use said second DFT coder for transmitting over said network.

6. The transmitter stage of claim 1, wherein said second DFT coder is coupled to receive one or more modulation symbols from a demultiplexing stage.

7. The transmitter stage of claim 1, wherein said first OFDM modulator is configurable to output OFDM symbols for transmission on component carriers.

8. The transmitter stage of claim 1, wherein at least the second power amplifier is coupled to receive the output of the second OFDM modulator through a cyclic-prefix insertion stage operable to insert cyclic-prefixes in said output from at least said second OFDM modulator.

9. A method of transmitting modulation symbols on multiple component carriers, comprising:
   applying a Discrete Fourier Transform (DFT) coding per set of modulation symbols, for two or more sets of modulation symbols, to output corresponding sets of DFT coded modulation symbols, wherein a first set of said two or more sets of modulation symbols is to be transmitted on a set of component carriers handled by the same power amplifier, wherein the component carriers in said set of component carriers are non-contiguous relative to each other;

applying Orthogonal Frequency Division Multiplexing (OFDM) modulation per set of DFT coded modulation symbols, for said sets of DFT coded modulation symbols, to output a first set of OFDM symbols for transmission on said set of component carriers, and output a second set of OFDM symbols for transmission on at least one additional component carrier distinct from said set of component carriers; and applying power amplification per said set of component carriers and per said at least one additional component carrier.

10. The method of claim 9, wherein each component carrier has a spectrum bandwidth spanning a frequency range compatible in bandwidth to a telecommunication system spectrum bandwidth.

11. The method of claim 10, wherein the spectrum bandwidth is defined by the spectrum bandwidth of a legacy telecommunication system.

12. The method of claim 9, further comprising demultiplexing one or more inputs to form said two or more sets of modulation symbols.

13. The method of claim 9, wherein the component carriers in said set of component carriers are non-contiguous with said at least one additional component carrier.

14. The method of claim 9, wherein a terminal implementing said method negotiates with a network to use said method, wherein said network is to be transmitted over by said terminal utilizing said method.

15. The method of claim 9, further comprising inserting cyclic-prefixes in OFDM modulated output.

16. The method of claim 9, wherein each component carrier comprises a series of resource blocks having a bandwidth spanning a portion of a spectrum and existing for a span of N consecutive symbols in the time domain.

17. A computer program product stored on a non-transitory computer-readable recording medium and comprising program code portions that, when run on one or more computing devices, cause the one or more computing devices to transmit modulation symbols on multiple component carriers, the program code portions causing the one or more computing devices to;

apply a Discrete Fourier Transform (DFT) coding per set of modulation symbols, for two or more sets of modulation symbols, to output corresponding sets of DFT coded modulation symbols, wherein a first set of said two or more sets of modulation symbols is to be transmitted on a set of component carriers handled by the same power amplifier, wherein the component carriers in said set of component carriers are non-contiguous relative to each other;

apply Orthogonal Frequency Division Multiplexing (OFDM) modulation per set of DFT coded modulation symbols, for said sets of DFT coded modulation symbols, to output a first set of OFDM symbols for transmission on said set of component carriers, and output a second set of OFDM symbols for transmission on at least one additional component carrier distinct from said set of component carriers; and apply power amplification per said set of component carriers and per said at least one additional component carrier.

18. The computer program product of claim 17, wherein each component carrier has a spectrum bandwidth spanning a frequency range compatible in bandwidth to a telecommunication system spectrum bandwidth.

19. The computer program product of claim 17, wherein the spectrum bandwidth is defined by the spectrum bandwidth of a legacy telecommunication system.

20. The computer program product of claim 17, wherein the program code portions further cause the one or more computing devices to demultiplex one or more inputs to form said two or more sets of modulation symbols.

* * * * *

UNITED STATES PATENT AND TRADEMARK OFFICE
CERTIFICATE OF CORRECTION

PATENT NO. : 8,542,645 B2  
APPLICATION NO. : 13/119512  
DATED : September 24, 2013  
INVENTOR(S) : Parkvall et al.

It is certified that error appears in the above-identified patent and that said Letters Patent is hereby corrected as shown below:

In the Specification

In Column 4, Line 40, delete "to and" and insert -- and --, therefor.

In the Claims

In Column 12, Line 7, in Claim 17, delete "to;" and insert -- to: --, therefor.

Signed and Sealed this
Fifth Day of August, 2014

Michelle K. Lee
*Deputy Director of the United States Patent and Trademark Office*